United States Patent
Monsalve-Gonzalez et al.

(10) Patent No.: US 8,053,010 B2
(45) Date of Patent: Nov. 8, 2011

(54) BRAN AND BRAN CONTAINING PRODUCTS OF IMPROVED FLAVOR AND METHODS OF PREPARATION

(75) Inventors: Adelmo Monsalve-Gonzalez, Plymouth, MN (US); Aruna Prakash, Plymouth, MN (US)

(73) Assignee: General Mills, Inc., Minneapolis, MN (US)

( * ) Notice: Subject to any disclaimer, the term of this patent is extended or adjusted under 35 U.S.C. 154(b) by 1235 days.

(21) Appl. No.: 10/005,052

(22) Filed: Dec. 4, 2001

(65) Prior Publication Data

US 2003/0104103 A1   Jun. 5, 2003

(51) Int. Cl.
*A23L 1/277* (2006.01)

(52) U.S. Cl. ........ 426/253; 426/254; 426/258; 426/263; 426/618; 426/619; 426/620; 426/621

(58) Field of Classification Search ............... 426/253, 426/254, 258, 263, 618, 619, 620, 621, 549
See application file for complete search history.

(56) References Cited

U.S. PATENT DOCUMENTS

| | | | |
|---|---|---|---|
| 3,845,229 A | 10/1974 | Rambaud | |
| 3,979,375 A | 9/1976 | Rao et al. | |
| 4,171,384 A | 10/1979 | Chwalek et al. | |
| 4,372,812 A * | 2/1983 | Phillips et al. | 162/40 |
| 4,376,130 A * | 3/1983 | Astrack et al. | 426/253 |
| 4,649,113 A | 3/1987 | Gould | |
| 4,806,475 A | 2/1989 | Gould | |
| 4,844,924 A * | 7/1989 | Astrack et al. | 426/258 |
| 4,919,952 A | 4/1990 | Sadaranganey et al. | |
| 4,986,997 A | 1/1991 | Posner et al. | |
| 5,089,282 A | 2/1992 | Wellman | |
| 5,104,671 A | 4/1992 | Wellman | |
| 5,153,014 A | 10/1992 | Cole, Jr. | |
| 5,186,968 A | 2/1993 | Wellman | |
| 5,194,276 A | 3/1993 | Hoseney et al. | |
| 5,194,287 A | 3/1993 | Wellman | |
| 5,219,601 A | 6/1993 | Devic | |
| 5,391,389 A | 2/1995 | George et al. | |
| 5,480,788 A | 1/1996 | Devic | |
| 5,523,109 A | 6/1996 | Hellwig et al. | |
| 5,871,800 A | 2/1999 | George et al. | |
| 6,497,909 B1 * | 12/2002 | Metzger | 426/254 |

FOREIGN PATENT DOCUMENTS

WO   WO 96/25862       8/1996
WO   WO 02/21936 A2 *  3/2002

OTHER PUBLICATIONS

Hoseney, C.R., 1994, *Principles of Cereal Science and Technology*, 2nd Ed., pp. 130-131.

\* cited by examiner

*Primary Examiner* — Lien Tran
(74) *Attorney, Agent, or Firm* — John A. O'Toole; Everett Diederiks

(57) ABSTRACT

Bran treatment methods are described, comprising acidifying bran with a acid to pH's ranging from 4-6 forming acidified bran and thereafter treating with low levels of ozone to oxidize native bitter constituent, ferulic acid, preferably to vanillin to provide better flavored bran. The treated bran is useful as an ingredient for use in products such as flour based food products such as flours, pastas, dry mixes, refrigerated uncooked doughs, pet foods, ready-to-eat cereals, breads, tortilla, and grain based snacks.

47 Claims, No Drawings

BRAN AND BRAN CONTAINING PRODUCTS OF IMPROVED FLAVOR AND METHODS OF PREPARATION

FIELD

The present invention relates to food products especially grain products such as wheat bran and flours containing wheat bran and to their methods of preparation.

BACKGROUND

Whole grain products are known to be rich in dietary fiber and other nutrients. Although many health benefits are associated with the consumption of whole grain products, many consumers avoid such products due to the relatively unpopular bitter taste and color associated with whole-wheat flours. This is especially true of children, who can be particularly selective in food choices.

It is generally believed that the presence of bran is a major cause of the taste and color problems associated with whole-wheat flours. Bitter flavors in bran and bran's dark color affect flours' appeal. For example, bran contains phenolic compounds, which may be responsible for the bitter and astringent taste. Certain phenolic compounds, such as tannins, can impart a brown or even grayish color to flour, particularly flours made from red wheat.

Thus, conventional processes used to produce non-whole wheat or white products remove as much bran as possible during milling, although thereby also removing a key nutritional component of the kernel. Specifically, bran not only contains fiber, but other healthy components that are known to be useful in preventing cancer, such as colon cancer.

Recent attempts to overcome these problems of bran's bitter flavor and dark color include use of specially milled and fractionated more bland white wheat or white wheat bran rather than more highly flavored and colored red wheat in an attempt to mask or reduce bran's bitter taste. (See, for example, commonly assigned U.S. Ser. No. 09/512,855 entitled "MILLING HARD WHITE WHEAT", filed Feb. 25, 2000 by L. E. Metzger et al., which is incorporated herein by reference).

However, since most wheat grown in the North America is of the red wheat varieties, another approach is to bleach wheat kernels especially red wheat with hydrogen peroxide and thereafter to mill the bleached grains to produce whole grain flours of reduced bitter flavor and of lighted color and thus improved appearance (see, for example, commonly assigned U.S. Ser. No. 09/392,699 entitled BLEACHED GRAIN AND GRAIN PRODUCTS AND METHODS OF PREPARATION filed Sep. 9, 1999 by L. E. Metzger, which is incorporated herein by reference).

Rather than the bleaching whole grain kernel, recent attempts also include bleaching isolated bran per se (see, for example, U.S. Ser. No. 09/663,914 entitled "BLEACHED BRAN AND BRAN PRODUCTS AND METHODS OF PREPARATION" filed Sep. 18, 2000 by A. Monsalve-González and L. E. Metzger et al., which is incorporated herein by reference).

Thus, there is a continuing need for whole wheat flours that can be used to provide finished whole wheat products that look and taste as good as those made with "regular" white flour. Also, there is a continuing need for bran products that are useful for addition to regular white or patent flour for the purpose of providing whole grain flours that are comparable to patent or white flours in taste, appearance and baking qualities, notwithstanding the presence of added bran in the flours.

The present invention provides further improvements in the provision of bran and bran containing products having improved flavor and appearance. In particular, the present invention provides further improvements in those methods of bleaching bran as are described in U.S. Ser. No. 09/663,914. While useful and effective, the methods therein described involve a wet treatment of bran with powerful bleaching agents such as hydrogen peroxide. The invention therein also involves techniques for maximizing the effectiveness of the relatively expensive hydrogen peroxide bleaching agent. In the present invention, an alternate bran treatment technique is described. The present invention resides in important part in the realization that substantial improvements in flavor of bran can be obtained by treatment to reduce a particular flavor constituent, ferulic acid, that is present at concentrations ranging only from about 20-50 ppm (parts per million). The present invention thus involves a milder oxygenation treatment of bran to oxidize these low concentrations of particular flavor constituent thereby substantially reducing the complexity and cost of bran treatment and also minimization of any detrimental effects of bran treatment. The present invention also is dry process and thus does not require an expensive post treatment drying step.

SUMMARY

In its method aspect, the present invention resides in bran treatments comprising treating bran having a native ferulic acid concentration with an edible acidulant in amounts sufficient to reduce the pH of the bran to about 4-6 to form an acidified bran; and, thereafter, reacting the acidified bran with ozone to oxidize at least a portion of the ferulic acid, especially at least a portion to vanillin, to provide a treated bran having a reduced ferulic acid concentration and an increased vanillin concentration whereby the flavor of the bran is improved. The bran can be pure or isolated bran or admixed with flour such as in a whole grain flour. The acidulant can be any edible acid or buffer system such as an aqueous solution or mineral or edible acids. The bran can be in particulate form and having a moisture content ranging from about 10-18% having been raised modestly from native moisture levels by the acidic aqueous solution addition.

The present invention provides a chemical oxidation treatment preferably of gaseous ozone that reacts with the bran portion of wheat kernels after cleaning and milling to produce treated bran without the bitter aftertaste normally associated with whole grain products. This is unlike conventional white grain processes that seek removal of bran in order to provide a product without a bitter taste. Treating only the bran portion of the wheat instead of the entire kernel reduces substantially the amount of ozone required, reduces the amount of material handling, and eliminates any potentially negative effects on flour functionality caused by treating an intact kernel.

In one variation, the present invention provides an intermediate treated bran product useful as a cereal ingredient in a variety of grain based products. In another variation, whole grain flour comprising treated bran in admixture with untreated flour having a high fiber content (10 to 12%) and other nutritional advantages of a whole grain flour that nonetheless has a white color and bland flavor comparable to conventional white flour is provided. The white whole grain flour comprises conventional flour and fortifying amounts of the intermediate treated bran product. In still another variation, bran admixed with flour such as in a whole grain flour is treated with ozone to produce a treated whole grain flour having improved flavor.

These and other features, aspects and advantages of the present invention will become better understood with regard to the following description, appended claims and accompanying drawings.

DETAILED DESCRIPTION OF INVENTION

The present invention is directed towards treated grain products such as treated bran, to grain based products comprising treated bran such as whole wheat flour, to finished products fabricated or containing either treated bran or treated bran containing whole wheat flours such as breads and ready-to-eat cereals, and to their methods of preparation. Each of the treatment method steps is described in detail as follows. These embodiments are described in sufficient detail to enable those skilled in the art to practice the invention, and it is to be understood that other embodiments may be utilized. It is also to be understood that mechanical, procedural and system changes may be made without departing from the spirit and scope of the present invention. The following detailed description is, therefore, not to be taken in a limiting sense, and the scope of the present invention is defined by the appended claims and their equivalents.

Wheat and Milling Background

The principle species of wheat are *Triticum aestivum* or bread wheat; *T. durum* which has extra hard kernels used primarily for macaroni and related pasta products; and *T. compactum* or club wheat, which has very soft kernels. Numerous varieties and cultivars within each species are known.

In the United States, wheat is classified according to whether it is hard or soft, white or red, and winter or spring. As a result there are eight possible designations including: hard white spring, hard red spring, hard white winter, hard red winter, soft white spring, soft red spring, soft white winter, and soft red winter.

The white or red designation refers to the color of the wheat kernel. Currently, red wheat is more readily available in the United States than white wheat. As noted above, red wheat has a distinctive taste due to the presence of high levels of polyphenol compounds, for instance, catechin and catechin tannins in the bran.

The hard or soft designation refers to protein strength and content of the wheat kernel. Tannin content is also known to be lower in soft wheat than hard wheat.

The winter or spring designation refers to the growth habitat of the wheat. Winter wheat is planted in the fall and harvested in the spring, whereas spring wheat is planted in the spring and harvested later that same crop year.

Wheat comprises a major starchy endosperm, a smaller germ or sprouting section of the seed and a surrounding bran or husk layer. The "endosperm" is the portion typically referred to, upon milling, as "flour" and generally makes up about 81-85% of the wheat kernel. Bran makes up about 11-15% of the kernel, with about one (1) to 3.5% being the germ portion. Bran with or without the germ is sometimes referred to as "mill feed". Mill feed is a low value commodity product of the milling process typically used for animal feed.

Wheat milling is a mechanical method of breaking open the wheat kernel to remove as much endosperm as possible from the bran and to grind or reduce the endosperm into flour. The process substantially separates the major components of the wheat sometimes equivalently referred to as "extracting" or "isolating" the major components from one another. Conventional whole-wheat flour is produced by grinding "sound" wheat, i.e., wheat that is substantially free of disease or other defects, other than durum. The proportion of natural constituents, other than moisture, remains similar to the intact wheat kernel. Conventional white flour is produced when most of the bran and germ are also separated or isolated from the endosperm. The germ fraction is usually separated from the rest of the kernel because its fat content limits the shelf life of the flour. However, some special purpose whole grain flours include not only the bran but also the germ fraction. The yield of flour or endosperm from milling is typically about 70-80%, with the remaining endosperm still present in the bran.

The isolated or bran portion (conventionally without the germ portion) can vary considerably in starch and fiber content. "Light" bran contains 10 to 20% starch and has a fiber content of about 38 to 48%. "Heavy" bran contains more than 20%, up to 30% starch, and has a fiber content of between about 25 to 35%. "Native" bran refers to non-treated bran, i.e., bran that has not been subjected to any chemical or physical treatment that may affect its dietary fiber content.

Wheat color can be measured using a colorimeter that uses either the CIE system or the triestimulus Hunter system. The Hunter value "L" denotes lightness; the "a" value denotes redness or greenness and the "b" value yellowness or blueness. A perfect white in the triestimulus scale has the following values: L=100, a=0 and b=0. Light bran obtained from winter soft wheat has an approximate triestimulus value range of L=70-74, a=4-5 and b=18-22. The latter parameters depend on crop year, location and growing conditions. Further discussion of the various types of wheats is found in the application entitled, "Bleached Grain and Grain Products and Methods of Preparation," Ser. No. 09/392,699, filed Sep. 9, 2000, commonly assigned, which is hereby incorporated by reference in its entirety.

Flour milling is a low margin/high volume commodity operation. As a result, while many improvements are technically possible on a lab scale or even small production scale, to be economically and commercially feasible, grain treatments must be low in cost and capable of being practiced using conventional equipment. Ideally, any new treatment techniques developed must be those that minimize the amount and thus the cost of any processing input such as energy or reaction materials. Even small increases in the cost of mill feed ingredients or operations can dramatically and disproportionately affect the profitability of a milling operation.

Bran Treatment Process

Broadly, the present bran treatment comprises two essential steps: acidifying and then oxygenation. The present methods first comprise an essential acidifying step or reducing the pH of the stating material to an acidic pH ranging from about 4 to 6, preferably from about 4.5 to about 5.5. This initial acidification step is desirable to minimize or reduce the ozone required in the second oxygenation step.

The starting material can be and in the preferred embodiment comprises isolated bran flakes or in powder form. The bran can be either heavy or light bran varying primarily in terms of the associated starchy component. In other less preferred embodiments, the isolated or pure bran can be diluted or admixed with the starchy flour component such as whole grain flour. Diluted staring materials are less preferred in part due to the relatively greater amounts of ozone consumed in the oxygenation step compared to the ozone consumption requirements of treating the isolated bran.

Optionally, the bran can be prepared by one or more pretreatment steps including for example, a washing step and/or a blanching step. In one embodiment, cleaned bran is optionally washed with a solution of chelating agents to remove or inactivate transition metals. In another example, if desired the bran can be subjected to an initial blanching or heat treatment step to inactivate indigenous catalase enzymes. Various pre-treatment steps can be combined and the order of treatment steps can be varied as convenient. These optional washing and blanching steps are described in more detail below.

The starting bran material of the milling process can be from any type of wheat, although bran from red wheat benefits the most from the present process. For this reason, red wheat bran can be the preferred starting material. In one embodiment, soft white wheat is used as the starting material since a whiter finished product can be obtained. In another embodiment, degermed whole grain red wheat flour is used as the starting material.

The wheat is cleaned and milled in any suitable manner known in the art to produce wheat bran. In one embodiment, "light" bran from winter soft white wheat is produced and used in the process. As noted above, milling does not completely separate the components. As a result, the wheat bran can contain wheat germ in amounts up to about 20 percent or more, and the starchy endosperm content can be about 15 to 30%, depending on type. Generally, higher amounts of starch require more ozone reagent for treatment, thus increasing costs.

The present invention finds particular suitability for use in connection with the treatment or flavor improvement processing of bran from wheat. While the present invention is thus described with particular reference to wheat, the present invention also finds usefulness in the provision of treated brans and/or whole flours of other common major cereal grains including those of barley, corn (maize), oats, rice, rye and mixtures thereof. While these major grains are most popular, minor useful grains include amaranth, millet, sorghum, triticale, flax and mixtures thereof. Indeed, since rye brans generally contain higher levels of the offending ferulic acid constituent than does wheat bran, the present invention is useful for improving rye bran flavor. However, since rye grain consumption is so much less than wheat, particular emphasis is given herein to wheat bran treatment. Also, the process can be used in connection with the treatment of bran from soybeans even though not a true cereal grain.

The bran starting material of the present methods can be any suitable particle size, such as 100 microns or more. Although finer bran with a smaller particle size can be used, undesirable clumping during the process can increase. In one embodiment, the bran is ground prior to the treatment process to produce ground bran having a particle size ranging from about one (1) to 40 microns. In another embodiment, the bran is ground during or at the end of the bleaching process. In yet another embodiment, the bran is not further ground after milling.

Bran's undesirable bitter flavor is due in important part to the presence of various phenolic constituents. However, these various phenolic constituents also contribute to bran's flavor, aroma and nutritional values. It is desirable to reduce the bitter perceived bitter flavor of bran without necessarily destroying or removing all the various phenolic constituents that contribute to certain of brans desirable nutritional and flavor features. It has been found that among these phenolic constituents, ferulic acid plays a prominent role in the undesirable flavor profile in part due to its higher concentration in bran.

The staring bran material is characterized by an initial or native concentration of ferulic acid that ranges from about 20-40 ppm with higher levels being associated with more pronounced bitter flavor. Particular levels of ferulic acid in bran depend upon such factors as grain type. For example, rye bran is well known as being particularly bitter in flavor and comparatively bitterer in flavor than wheat bran and generally contains higher levels of ferulic acid. Other grains are milder in flavor and contain lower levels of the bitter phenolic constituent, ferulic acid. The ferulic acid level is also influenced by grain variety. For example, red wheat bran is more bitter generally than is the bran from white wheat. Brans of various locations and crop years also vary in the ferulic acid level.

The present methods can optionally comprise a washing pre-treatment step. The bran-treatment process begins when untreated or raw bran is treated with a chelating agent in order to substantially inactivate or remove transition metals present in the bran. Such metals include, but are not limited to, manganese, copper and iron. This is helpful because active transition metals can decompose treatment agents, such as ozone. Since milling is a commodity process, small increases in the efficiency of peroxide utilization are important to obtain commercially practical methods.

Any suitable type of transition metal sequestering components, i.e., chelating agents, can be used. This includes, but is not limited to, any orthophosphate, metaphosphate, pyrophosphate (e.g., tetra sodium pyrophosphate), polyphosphate, 1,2, diaminoethane, ethylenediaminetetraacedic acid (EDTA), and so forth. The EDTA can be in the form of calcium EDTA or sodium EDTA. With the exception of EDTA, the chelating agent can be present in any suitable concentration, such as between about one (1) to two (2)%. Generally, higher concentrations of chelating agents remove more metals, although the upper level is generally limited by good manufacturing practices. However, since end-product levels of EDTA are mandated by the U.S. government, EDTA is typically added at much lower concentrations, such as between about 0.02 to 0.1% (200 to 1000 ppm) in solution with water.

The chelating agent needs to be present for a sufficient time and at a sufficiently high temperature in order to minimize the effect of the transition metals. In one embodiment, the chelating process is relatively rapid, taking only about one (1) to 15 minutes at a temperature of about 70 to 90° C. In another embodiment, the process takes less than about one (1) minute. In yet another embodiment, the process takes between about one (1) to two (2) minutes to complete at a temperature of about 80° C.

At this point, between about 40 to 60% of the manganese, about 50% of the copper, and about 10 to 20% of the iron have been removed or inactivated. In another embodiment, more than 60% of the manganese, more than 50% of the copper, more than 20% of the iron, as well as amounts of other transition metals, have been removed or inactivated. In a specific embodiment, the resulting material has less than about six (6) ppm copper, less than about one (1) ppm of manganese, and less than about ten (10) ppm of iron. As a consequence of the washing steps, starch is also removed. In one embodiment, the amount of starch is reduced after two washing steps from about 19-20% to less than about three (3)%, by weight.

In one embodiment, the mixture of bran and chelating agent solution contains about 30% solids and about 70% liquids, by weight. In a specific embodiment, about 45.4 kg (100 lbs) of bran is mixed at ambient temperature with a liquid solution of 0.06% EDTA weighing about 106 kg (233 lbs).

The treated bran is then washed and rinsed in a first washing and rinsing step 104 as shown in the Figure. In this step, water is used to partially rinse away the chelate transition metal that has combined with the chelating agent. Preferably, the water is soft water with low levels of iron (less than about five (5) ppm), manganese (less than about 0.02 ppm) and copper (less than about 0.02 ppm). (Soft water is generally defined as water having less than about two (2) grains of hardness (calcium and magnesium) per gallon). In one embodiment, distilled or deionized water is used. Washing can be accomplished with a suitable amount of agitation. Rinsing can also be accomplished by any suitable means, such as with a combination of agitation and spraying. The resulting washed bran is filtered or dewatered in a first filtering step by any suitable means, such as with centrifugation mechanical pressing or low-pressure extrusion. The water (waste or recycle) stream containing the chelating agent can be recycled for use again in the process or discarded, as desired. In one embodiment, there is no first washing and rinsing step or first filtration step, although empirically, it is believed that washing also serves to remove some of the soluble bitter-flavor components.

The present bran treatment methods can further optionally additionally comprise a blanching or heat pre-treatment step washed bran to inactivate indigenous catalase and peroxidase enzymatic systems (known as hydroperoxidases) that can detrimentally affect the activity of the oxygenation reagent by decomposing it. Peroxidase is a heat stable indicator enzyme, i.e., once the peroxidase is inactivated, most other enzymes have also been inactivated. In one embodiment, the blanching step is performed at a temperature of about 75 to 85° C. for three (3) to ten (10) minutes, although the invention is not so limited.

Residual catalase enzymatic activity can be measured by any suitable method. In one embodiment, about 99% of the enzyme activity is destroyed in the blanching step 110. In another embodiment, residual enzyme activity is below about ten (10) CIU/g bran (catalase international units). CIU refers to the amount of enzyme in grams that catalyses the decomposition of one (1) micromole of hydrogen peroxide per minute.

The starting bran material, optionally washed and/or blanched, is characterized by a moisture content ranging from about 6% to 15% and the bran is thus in the form of a dry loose powder. If optional pre-treatment steps are employed that result in higher moisture contents, then a drying pre-treatment step can be employed to adjust the moisture content to within the desired range.

As described briefly above, the present methods comprise the first essential step 118 of acidifying the bran, optionally washed and blanched. In the acidifying step 118, the bran is treated with an acidic substance, such as an aqueous solution of an acid or acidic-buffered solution applied in amounts sufficient to reduce the pH of the bran from its initial or native pH to a pH ranging from 4 to 6 to form acidified bran. Useful herein are food grade mineral acid such as hydrochloric acid, sulfuric acid, phosphoric acid and/or organic acids such as citric acid, malic acid, succinic acid, tartaric acid, fumaric acid, and mixtures thereof. Preferred for use herein is hydrochloric acid due to its high dissociation constant in aqueous system.

The particular concentration of the acid in the aqueous solution is not critical per se. However, it is desirable to maintain the moisture content of the bran within the range of 6% to 15% to keep the bran as a workable powder. Thus, when extra levels of moisture are added such as when dilute solutions are employed, the present invention can involve moisture removal such as drying to maintain the bran moisture content within the desired levels. For example, the bran can be dried to lower moisture levels in anticipation of the amount of added moisture anticipated to be added by the present acidification step.

Those skilled in the art will recognize that the equipment used in the above-described process can be any conventional equipment typically utilized for the particular steps. In one embodiment, a drum dryer operating at about 207 to 345 kPA (30 to 50 psi), such as about 276 kPA (40 psi), is used in the drying step 132.Drum drying provides a quick and economic method for drying the bran.

Thereafter, the present methods further essentially include the step of oxygenating the acidified bran with ozone, $O_3$, to provide a treated bran product of the present invention whereby at least a portion of the ferulic acid is reacted to reduce the ferulic acid level of the bran from its native level.

Ferulic acid is 4-hydroxy-3-methoxy cinnamic acid and is comprised of a phenolic structure with a particular conjugated diene moiety attached thereto and is generally understood to have the following structure:

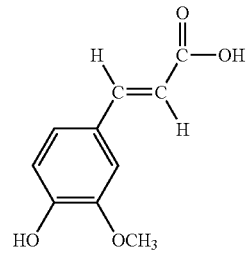

While not wishing to be bound by the proposed theory, it is speculated herein that the present flavor improvement results importantly in part in ozone reacting with the ferulic acid to thereby reduce its concentration in the bran. In more preferred embodiments, the ferulic acid level is reduced from its initial value by at least 25%. In such finished treated products, the ferulic acid level can range from about 15 ppm to about 30 ppm. In more preferred embodiments, the ferulic acid level is reduced by at least 50% from native levels and treated bran products are characterized by ferulic levels ranging from about 1 ppm to about under 20 ppm.

Moreover, in more preferred embodiments, the present invention resides in the controlled oxygenation of bran such that at least a portion of the ferulic acid is reacted with ozone to convert into vanillin. It is speculated herein that the ozone reacts against the two double bonds of the conjugated diene moiety releasing $CO_2$ as a byproduct and forming vanillin as an aldehyde reaction product. Vanillin has the following chemical structure:

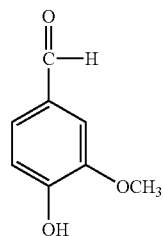

Vanillin is 4-hydroxy-3-methoxybenzaldehyde as shown above and has a molecular weight of 154. Vanillin, of course, is the principle flavor constituent of vanilla flavor. Vanilla flavor derived from vanilla beans of course is rich in vanillin. Most vanilla flavor, however, comprises synthetic or synthesized vanillin.

Of course, bran will have some level of naturally occurring vanillin. Generally, untreated bran has a native or initial vanillin level generally about 1 ppm although levels as high as 5 ppm are not unknown. In the preferred embodiment, the oxygenation step results in an increase in the vanillin level to at least twice its native level. Thus, the vanillin level of the present treated bran can range from about 10 to 20 ppm. In even more preferred embodiments, the ferulic acid to vanillin ranges in a ratio of less than 2.5:1.

Treated brans of the present invention exhibit surprising improved flavor. The improved flavor is not only the result of the reduction in ferulic acid but also resides in part, it is believed, from the presence of desirable vanilla flavor from the vanillin that serves to mask the bitter flavor of any residual ferulic acid that remains after treatment. Such delicate flavor balancing can not be achieved merely by vanilla flavor or vanillin addition which even at low levels of flavor addition adds much more vanillin than the still very low levels present in the treated bran products.

The amount of ozone employed depends upon a variety of processing parameters and desired level of oxygenation. Insufficient ozone use can result in higher levels of ferulic acid remaining in the treated bran. However, if excessive ozone treatment is made, then the oxygenation process will be driven so far that desirable vanillin is destroyed and the resulting treated bran will have lower levels of vanillin. Balancing these offsetting considerations requires attention to measuring the finished products ferulic acid and vanillin levels. Good results are obtained when, in preferred embodiments, the ozone utilization rates range from about 0.1 to 1 parts of ozone per 100 parts bran and more preferably about 0.3 to 0.7 parts.

The treatment step 118 can be practiced conveniently at atmospheric pressure. Although higher pressures can be employed, equipment needed to practice pressurized treatment is more expensive. Treatment step 118 can also be likewise conveniently practiced at ambient bran temperatures.

The ozone can be conveniently admixed with the bran such as by sparging low-pressure ozone while the bran is agitated. If desired, supplemental air can be used to mix or suspend the bran during treatment. The ozone can be separately added or mixed with the air. The duration of the treatment step is short ranging from under a minute to up to 10 minutes. Good results have been found when the step is practiced from 1-5 minutes at room temperature and atmospheric pressure. Measuring the residual ferulic level and desirable vanillin levels generally controls the endpoint of the treatment step. Good results are obtained when the weight ratio of ferulic acid to vanillin level is less than 2.5:1 in the treated bran so prepared.

Conveniently, the treated bran requires no further processing. Any residual unreacted ozone can be removed easily. Specifically, the bran does not require any further processing or drying.

It should be noted that typical white flour is usually "treated" using a combination of chlorine, benzoyl peroxide and/or azodicarbonamide. These oxidants exert their action by oxidizing the carotenoid pigments that give the yellow color to flour. However, conventional bleaching processes do not easily oxidize the components in bran that are responsible for the brown coloring, e.g., such as lignin and other polyphenols. As such, oxidants such as chlorine, benzyl peroxide and azodicarbonamide would not be suitable oxidants in the processes of this invention. Furthermore, chlorine bleached white flour is undesirable in many countries and not used. As a result, most baked goods outside the United States do not have as light a texture, i.e., they are much denser. Ongoing attempts to improve functionality in these products include use of unbleached white flour, heat-treated white flour, bleached white flour and/or mixtures thereof.

Flours comprising this bran exhibit minimal or no enzyme activity, such as polyphenoloxidase and lipoxygenase activity, which help to increase flour stability, particularly as it relates to rancidity during storage.

The resulting bran also has an improved taste as compared with untreated bran. The improvement in taste is significant enough to be noticeable by most consumers.

The treated bran product of the present invention is suitable as an intermediate product that can be recombined with flours to produce a whole grain flour, e.g., whole wheat flour having a fiber content comparable to conventional whole wheat flours, i.e., about 10 to 12% that is characterized as having a noticeably lower level of bitter flavor. In one embodiment, the flour is "whole grain" flour, such that the fiber content is at least about 5.5 g of dietary fiber per 100 g of flour. The fat content of the composite flour can vary from about one (1) to three (3)%. However, the fat content can be adjusted, as needed, such as with the addition of germ to the fiber. In one embodiment, the fat content of the composite flour is about two (2)%.

The flours can be of various types, such as bread flour (e.g., from hard wheat) having a higher gluten content or protein level, all-purpose flour used in a variety of baked goods having an intermediate gluten level, including breads, cakes, muffins, and so forth, pastry flour (soft wheat) having a lower gluten content or durum flour. In one embodiment, the bran is recombined with durum flour, to produce pasta.

In one embodiment, the bran is sold as a bran ingredient than can be beneficially added to a variety of food products such as into dry mixes, added to ready-to-eat cereals, refrigerated uncooked or bakeable doughs, cooked cereal dough, and so forth. The cooked cereal dough can be fabricated into ready-to-eat cereals, puffed snacks such as deep fried snacks or pet foods. Use of bran in ready-to-eat cereals increases the dietary fiber content and the antioxidant activity of the cereal while maintaining the desirable flavor of such products fabricated from cooked cereal doughs. In one embodiment, the bran is admixed with dry mix ingredients such as with flour, sugar, leavening agents (e.g., baking soda, baking powder, etc.) and salt to form a variety dry mix useful for making various items such as pancakes, muffins, quick breads, and other baked goods whether for individual or family use or for commercial or institutional scale products. In another embodiment, the bran is combined with soy to produce various soy products, such as meat-substitute products. In one embodiment, the invention comprises any of the above named intermediate or dry mix products in the form of their end finished or end products, e.g., baked bread.

In one embodiment, the bran is sold as a bran ingredient, put into dry mixes, added to ready-to-eat cereals, refrigerated uncooked or bakeable doughs, cooked cereal dough, and so forth. Use of bran in ready-to-eat cereals increases the dietary fiber content and the antioxidant activity of the cereal. In one embodiment, the bran is admixed with sugar, leavening agents (e.g., baking soda, baking powder, etc.) and salt. In another embodiment, the bran is combined with soy to produce various soy products, such as meat-substitute products. In one embodiment, the invention comprises any of the above named end products.

In the R-T-E cereal preparation aspect of the present invention, the present methods additionally can comprise the steps of adding fortifying amounts of the treated bran to other cereal ingredients: and D) combining the cereal ingredients with water and minor amounts of other ingredients, (e.g., salt(s), sugar, starch) and E) cooking in a cooker to form a cooked whole grain cereal dough. The cooked cereal dough will have a moisture content of about 12 to 35%. Broadly, the present methods can further comprise the step of F) forming the cooked cereal dough into a finished R-T-E cereal. A variety of embodiments and variations within embodiments of various sub steps can be used to practice the broad steps.

For example, in one preferred embodiment, conventional extended cook time cereal cookers are employed to prepare the cooked cereal dough. In this embodiment, cook times can range from about 30 to 70 minutes at 200 to 230° F. (93 to 110° C.) representing a 5 to 15% reduction in cook times compared to conventional processing. Notwithstanding the reduced cook times, the based cooked cereal doughs are characterized by the desired cooked flavor characteristic of an extended cooked cereal dough.

In this preferred embodiment, step F can comprise the sub step of 1) forming the dough 8 into pellets in a pellet former. In one variation the pellets can be thereafter 2) dried to a moisture content of about 8 to 14% in a pellet dryer and then 3) puffed (e.g., gun puffed) to form puffed whole grain puffed pieces. The puffed cereal pieces can also be 4) toasted in toaster to further develop a toasted flavor to form toasted puff pieces.

In another variation of this embodiment, the dried pellets are optionally tempered in temper bins or equivalently on temper belts and then flaked, such as with flaking rolls to form wet oat flakes having a moisture content of about 12 to 18% and then toasted in toaster to tenderize and partially expand the flakes to form toasted flakes.

In another embodiment, the cereal ingredients comprising the treated bran is combined with minor amounts of the other R-T-E cereal ingredients and water and cooked in a short time cooker extruder, whether a single screw or twin screw extruder, for about 0.5 to eight minutes and mechanically worked to form the cooked cereal dough. In preferred embodiments, the present whole grain flour comprises 80%> of the dough (dry weight basis). The dough can optionally include a variety of starches or other farinaceous materials. In one variation of this embodiment, the cooked cereal dough is similarly processed as described above to produce either a flaked product or a puffed product, including a toasted puffed product. The cooked dough can be fed to a pellet former or the cooker extruder can be equipped with a pellet forming die head to form pellets which are fed directly to the pellet dryer.

In another variation, the cooked cereal dough is extruded under conditions of temperature and pressure and through appropriately shaped and sized dies so as to cause an immediate expansion or puffing of the cooked cereal dough upon extruding to ambient conditions or "directly expanded". The directly expanded puffed cooked cereal dough is then face cut to form individual pieces. The puffed pieces can be any suitable size and shape such as letters or as ring shaped pieces. The individual puffed cereal pieces can optionally be toasted to impart a desirable further developed toasted flavor to the puffed pieces whether by radiant heating, hot air and/or high intensity microwave heating. It is a surprising advantage that the present flours can be used to produce by direct expansion high whole flour (i.e., 80%>, dry weight basis) puffed cooked cereal dough pieces having a high toasted grain flavor. Thereafter, the puffed pieces or flakes, whether dried or toasted to 2 to 6% moisture, can be directly packaged for sale to consumers.

It has been previously known that material containing cooked cereal doughs can be directly expanded. However, the doughs in prior known methods suffered from one or more deficiencies including using flour ingredients that are defatted, or high levels of starch, or lack of cooked grain flavor, or had an undesirable texture due to overworking the cereal dough in the cooker extruder.

In another variation, the pieces, whether puffed or flaked and/or toasted, can be presweetened by topically adding a sugar syrup sweetener composition. In this embodiment, the cereal pieces or cereal base, can be charged to an enrober and the sugar syrup heated in heater is topically applied thereto. The enrobing tumbling action is continued for a few minutes to evenly coat the cereal base. If desired, various particulates such as nut pieces, fruit bit pieces, bran, or other topical additives can be added to the enrober. A vitamin solution optionally can also be added to the cereal base such as by adding to enrober such as by in line admixing with the heated sugar syrup or by separately spraying in the enrober. The coated cereal base whether puffed, flaked, shredded, biscuit, shredded biscuit, cut dough sheet pieces, or other forms is then dried in dryer to a final moisture content of about 2 to 5% to remove the added moisture associated with the sugar syrup to form a presweetened finished R-T-E cereal. The finished cereal is then conventionally packaged 56 for distribution and sale to customers.

Analysis of phenolic compounds by HPLC requires the use of a linear gradient pumping system. The gradient profile for this analysis is shown in column 3. A 20 μL aliquot is injected onto a C18 reverse phase column (Waters Symmetry, 4 μm, 4.6×300 mm), and the gradient listed below is utilized.

| Time (min.) | Flow Rate (mL/min) | % B (Methanol) | % C (6% Acetic Acid in Water) |
|---|---|---|---|
| Initial | 1.5 | 2 | 98 |
| 15 | 1.5 | 2 | 98 |
| 35 | 1.5 | 69 | 31 |

The phenolics are detected using a UV detector at 280 nm. There are several peaks that elute during the phenolic HPLC run of the flour extract. One of the peaks has a retention time of 14 minutes that corresponds to vanillin and the other peak has a retention time (26.5 min) corresponding to that of ferulic acid.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims

What is claimed is:

1. A method for treating a grain based product bran, comprising:
    Reacting bran having a native ferulic acid concentration with 0.1 to 1 parts ozone per 100 parts bran to produce treated bran having a reduced ferulic acid finished concentration of less than 30 ppm, wherein the bran has a native concentration of vanillin and wherein the treated bran has an elevated finished concentration of vanillin.

2. The method of claim 1, additionally comprising the step of:
    Acidifying bran with an edible acidulant in amounts sufficient to reduce the pH of the bran to about 4-6 to form acidified bran prior to treating with ozone.

3. The method of claim 2 wherein the finished ferulic concentration of the treated bran is less than 50% of the native concentration of the bran.

4. The method of claim 1 wherein the finished concentration of vanillin is at least twice the native concentration of vanillin.

5. The method of claim 2 wherein the bran is derived from a member selected from the group consisting of barley, corn (maize), oats, rice, rye, soybeans, wheat, and mixtures thereof.

6. The method of claim 5 wherein the bran is wheat bran.

7. The method of claim 6 wherein the bran is red wheat bran.

8. The method of claim 1 wherein the bran is in dry powder form having an average particle size of about 100 microns.

9. A method for treating a grain based product bran, comprising:
Reacting bran having a native ferulic acid concentration and a native concentration of vanillin with ozone to produce treated bran having a reduced ferulic acid finished concentration;
Acidifying the bran with an edible acidulant in amounts sufficient to reduce the pH of the bran to about 4-6 to form acidified bran prior to treating with ozone;
Prior to acidifying, treating the bran with a chelating agent to remove transition metals to produce treated bran; and
Blanching the treated bran to inactivate catalase and peroxidase enzymatic systems to produce blanched bran having the reduced ferulic acid finished concentration and an elevated finished concentration of vanillin.

10. The method of claim 9 wherein the bran is treated with the chelating agent for about one (1) to fifteen (15) minutes at a temperature of about 70 to 90° C.

11. The method of claim 9 wherein the chelating agent is selected from the group consisting of orthophosphate, metaphosphate, pyrophosphate, polyphosphate, calcium ethylene diamine tetra acetic acid (EDTA) and sodium EDTA.

12. The method of claim 11 wherein the chelating agent is calcium EDTA or sodium EDTA in a concentration of between about 0.02 and 0.1%.

13. The method of claim 9 wherein the blanching step is performed at a temperature of between about 75 to 85° C. for about three (3) to ten (10) minutes, further wherein residual enzyme activity is below about 10 CIU/g bran following the blanching step.

14. The method of claim 9 further comprising:
Washing and rinsing the bran to produce wet bran;
Filtering the wet bran to produce filtered wet bran; and
Drying the treated filtered wet bran to produce dried treated bran having a moisture content ranging from about 6% to 15%.

15. The method of claim 2 wherein the acidulant comprises a mineral acid.

16. The method of claim 2 wherein the acidulant comprises an edible organic acid.

17. The method of claim 2 wherein the bran is in powder form and has a moisture content ranging from about 6% to about 15%.

18. The method of claim 2 wherein the treatment step comprises contacting about 100 parts acidified bran with about 0.3 to 0.7 parts ozone.

19. The method of claim 1 wherein the bran is pure bran.

20. The method of claim 2 wherein the bran is admixed with flour.

21. The method of claim 16 wherein the edible organic acid is dissolved in water.

22. The method of claim 18 wherein the bran is reacted with ozone at atmospheric pressure.

23. The method of claim 19 additionally comprising the step of:
Blending the treated bran with flour to form a whole wheat flour comprising treated bran.

24. The method of claim 23 additionally comprising the step of:
Forming a dry mix for baked goods by admixing the whole wheat flour comprising treated bran with dry mix ingredients.

25. The method of claim 23 wherein all the flour in the dry mix is supplied by the whole wheat flour comprising the treated bran.

26. The method of claim 23 additionally comprising the steps of:
Combining the whole wheat comprising treated bran with cereal ingredients to form a cereal blend;
Cooking the cereal blend to form a cooked cereal dough;
Forming the cooked cereal dough into dried finished cereal pieces.

27. The method of claim 26 wherein the finished cereal pieces are puffed.

28. The method of claim 27 wherein the puffed cereal pieces are deep fat fried.

29. The method of claim 26 wherein the bran is wheat bran.

30. The method of claim 29 wherein at least a portion of the wheat bran is red wheat bran.

31. The method of claim 29 wherein the dried finished cereal pieces are flakes.

32. The product prepared by the method of claim 1.

33. The product prepared by the method of claim 2.

34. The product prepared by the method of claim 1.

35. The product prepared by the method of claim 1 having an antioxidant activity about 15 to 35% higher than native bran.

36. The product prepared by the method of claim 9.

37. The product prepared according to the method of claim 10.

38. The product prepared according to the method of claim 17.

39. The product prepared according to the method of claim 20 wherein about five (5)% treated bran, by weight, is added to the whole wheat flour.

40. A grain product comprising cereal bran having a ferulic acid concentration of less than 30 ppm and an elevated concentration of vanillin.

41. The grain product of claim 40 having a pH ranging from about 4-6.

42. The grain product of claim 41 having a moisture content ranging from about 10% to 15% prepared from soft white wheat or hard white wheat.

43. The grain product of claim 42 wherein the grain product is prepared from light bran.

44. The product of claim 39 having a pH of about 6.3 to 6.7.

45. The grain product of claim 40 in the form of a finished baked good.

46. The method of claim 30 wherein the whole wheat flour is admixed with sugar, salt, and leavening.

47. The grain product of claim 40 wherein the grain product is added to foods selected from the group consisting of dry mixes, ready-to-eat cereals and soy.

* * * * *